(12) United States Patent
Meller et al.

(10) Patent No.: US 9,182,040 B2
(45) Date of Patent: Nov. 10, 2015

(54) FLUID ROTARY PASSAGE

(71) Applicant: GAPI Technische Produkte GmbH, Rösrath (DE)

(72) Inventors: Dieter Meller, Alfter (DE); Andreas Flint, Köln (DE)

(73) Assignee: GAPI Technische Produkte GmbH, Rösrath (DE)

( * ) Notice: Subject to any disclaimer, the term of this patent is extended or adjusted under 35 U.S.C. 154(b) by 190 days.

(21) Appl. No.: 13/738,030

(22) Filed: Jan. 10, 2013

(65) Prior Publication Data
US 2013/0175762 A1 Jul. 11, 2013

(30) Foreign Application Priority Data
Jan. 11, 2012 (DE) .................... 20 2012 000 209 U (51) Int. Cl.
*F16J 15/00* (2006.01)
*F16J 15/16* (2006.01)
*F16L 27/087* (2006.01)

(52) U.S. Cl.
CPC ............... *F16J 15/16* (2013.01); *F16J 15/002* (2013.01); *F16L 27/087* (2013.01)

(58) Field of Classification Search
CPC ........... F16J 15/16; F16J 15/34; F16J 15/164; F16J 15/32; F16J 15/40; F16J 15/54; F16J 15/002; F16L 27/087
USPC .......................... 277/500, 401, 512, 408, 431
See application file for complete search history.

(56) References Cited

U.S. PATENT DOCUMENTS

| | | | |
|---|---|---|---|
| 875,934 A * | 1/1908 | King | 277/346 |
| 2,310,309 A * | 2/1943 | Orr | 137/580 |
| 3,285,614 A | 11/1966 | McClenathan | |
| 3,333,856 A * | 8/1967 | Voitik | 277/348 |
| 4,202,553 A | 5/1980 | Kropp | |
| 6,439,044 B1 * | 8/2002 | Tigges | 73/146.2 |
| 6,561,515 B1 * | 5/2003 | Bjornson | 277/358 |
| 2011/0018208 A1 | 1/2011 | Meller | |

FOREIGN PATENT DOCUMENTS

| | | | | |
|---|---|---|---|---|
| DE | 19502079 A1 | 7/1996 | | |
| GB | 2297363 A * | 7/1996 | ............... | F16J 15/44 |

OTHER PUBLICATIONS

Int'l Search Report issued Nov. 5, 2010 in related Int'l Application No. PCT/EP2010/060230.

* cited by examiner

*Primary Examiner* — Kristina Fulton
*Assistant Examiner* — Nathan Cumar
(74) *Attorney, Agent, or Firm* — Panitch Schwarze Belisario & Nadel LLP (57) ABSTRACT

A fluid rotary passage is provided for sealing a fluid pressure chamber between a rotatable shaft and a shaft seat. The fluid rotary passage includes a sealing ring carrier and a fitting body, rotationally fixed or in contact with one of the shaft and the shaft seat in a fluid-tight manner and radially spaced from each other to create the chamber between them. Two sealing rings are provided axially spaced from each other and each sealingly applied with one contact surface against the carrier and one against the fitting body, for sealing the chamber against the outside. The carrier and the fitting body together form two axially spaced receiving grooves for the sealing rings, which are open toward the chamber and have at least one holding protrusion at least partially securing the sealing ring disposed in the respective receiving groove against a radial dislocation from the groove toward the chamber.

26 Claims, 5 Drawing Sheets

FLUID ROTARY PASSAGE

BACKGROUND OF THE INVENTION

The invention relates to a fluid rotary passage for sealing a fluid pressure chamber between a rotatable shaft and a shaft seat, wherein the fluid rotary passage comprises a sealing ring carrier and a fitting body, wherein the sealing ring carrier is rotationally fixed to the shaft or to the seat in a fluid-tight manner and the fitting body is in contact with the other component in a fluid-tight manner, wherein the fitting body and the sealing ring carrier are radially spaced from each other, at least in sections, in order to create a fluid pressure chamber between them, and wherein two sealing rings are provided which are axially spaced from each other and which are each sealingly applied against the sealing ring carrier with one contact surface and which are sealingly applied against the fitting body with one contact surface, for sealing the fluid pressure chamber against the outside, and which can each be twisted, preferably independently from each other, with respect to the sealing ring carrier and/or to the fitting body, Fluid rotary passages of this kind are used in various applications such as transmissions, in which the shaft is arranged in a rotatable manner with respect to the shaft seat, wherein a fluid pressure chamber is formed between the shaft and the shaft seat. In most cases, the rotatable shaft is constructed as a hollow shaft whose hollow space constitutes a fluid passage channel. The fluid passage channel of the shaft can be connected to the fluid pressure chamber in such a manner that a fluid can pass through. Also the shaft seat is often constructed as a hollow shaft and thus can also include a fluid passage channel that can be connected to the fluid pressure chamber in such a manner that a fluid can pass through. The fluid in the fluid pressure chamber between the shaft and the shaft seat is mostly pressurized. While oil such as hydraulic oil is frequently used as a fluid, air or a different gas can be used as well. The following embodiments can be used with any suitable fluid such as oil or air.

In fluid rotary passages of like kind, a sealing ring carrier is rotationally fixed to the shaft or to the shaft seat in a fluid-tight manner, and a fitting body is in contact with the respective other component of the shaft and the seat in a fluid-tight manner. The fitting body and the sealing ring carrier are radially spaced from each other, at least in sections, and form between them the fluid pressure chamber between the shaft and the shaft seat. The fluid pressure chamber is sealed against the outside via sealing rings, wherein the sealing rings are axially spaced from each other and are in sealing contact with the sealing ring carrier and the fitting body respectively via a contact surface thereof. The sealing rings are twistable with respect to the sealing ring carrier and/or the fitting body.

Accordingly, fluid rotary passages of like kind are constructed as a sealing arrangement, which comprises the elements: fitting body, sealing ring carrier, and sealing rings. The sealing arrangement can also comprise the shaft and/or the shaft seat. In fluid rotary passages of like kind, high relative rotational speeds can be implemented between the shaft and the shaft seat because the entire relative rotational movement is received by the sealing rings, whereas the sealing ring carrier and mostly also the fitting body are fixed for rotation with the shaft or the shaft seat. This particularly guarantees a reduction of friction losses in the fluid rotary passage and thus a prevention of a high temperature increase at high relative rotational speeds. Accordingly, in fluid rotary passages of like kind, relative twisting between the shaft and the shaft seat is enabled by a relative rotation of the fitting body and/or the sealing ring carrier with respect to the sealing rings. However, minor slippage of the fitting body and possibly also of the sealing ring carrier relative to the respective supporting component, i.e. the shaft or the shaft seat may however also occur during relative rotational movements.

Therefore, the co-action of the sealing rings with the fitting body or the sealing ring carrier in the fluid rotary passage is particularly important. The sealing rings are mostly made from a synthetic material and can be cut through at one circumferential position. The sealing rings have surfaces by which they can form at least one contact surface with the sealing ring carrier and the fitting body. In fluid rotary passages of like kind, the sealing ring carrier can be constructed, for example, as a sheet metal forming part in the manner of a double-collar bushing press-fitted to the shaft. However, the sealing ring can also be integrally formed with the shaft and particularly the sealing ring carrier can be a texture milled into the shaft. The fitting body can be formed, for example, as an injection-molded part from a high-strength synthetic material.

In fluid rotary passages of like kind, the sealing rings, the sealing ring carriers and the fitting body require a construction which guarantees preferably perfect sealing of the fluid pressure chamber against the outside through the contact surfaces of the sealing rings with the fitting body or with the sealing ring carrier on the one hand and lowest possible friction losses between the sealing rings and the fitting body or the sealing ring carrier on the other hand. In conventional fluid rotary passages this is achieved by the sealing rings being in contact with the sealing ring carrier or with the fitting body exclusively via their contact surfaces. However, various problems occur in this case.

For example, the assembly of conventional fluid rotary passages is difficult and it must be taken into account that during the assembly the shaft is introduced into the hollow shaft, with the sealing ring carrier, the fitting body and the sealing rings disposed between the hollow shaft and the shaft. For preventing friction in the assembled fluid rotary passage, the sealing rings are loosely arranged between the sealing ring carrier and the fitting body, while precisely the mounting of the sealing ring, for example, its fixation by inserting or clamping the sealing ring into a groove, is avoided. Accordingly, the sealing rings can be placed in a predetermined position only with difficulty. In addition, the fixation of the sealing rings at least is not possible as long as the fluid pressure chamber is not filled with pressurized fluid. This complicates the assembly of the fluid rotary passage on the one hand and may cause malfunction such as leakage in the assembled fluid rotary passage as a result of faulty positioning of the sealing ring on the other hand.

In fluid rotary passages of like kind it turned out that particularly the sealing rings frequently lack sufficient inherent rigidity, which makes installation much more difficult. Further, in fluid rotary passages of like kind, the sealing rings frequently tend to twisting as a result of being insufficiently guided in the fluid rotary passages, particularly prior to the presence of a pressurized fluid in the fluid pressure chamber.

In fluid rotary passages of like kind, sealing rings find their sealing position provided in the fluid rotary passage only behind time and/or insufficiently. This may lead to malfunction such as considerable leakage of the fluid rotary passages on the one hand. On the other hand, the response can be insufficient, particularly at a low fluid pressure of the fluid and/or at low relative rotation speeds of the shaft with respect to the shaft seat. This can be the case, for example, at a low rotation speed of the shaft relative to the shaft seat if the shaft is driven for example by a motor at its idling speed. For example, it is possible for a sealing ring to vary its position in the fluid rotary passage as long as the sealing ring is not arranged in its predetermined sealing position. As a result, the sealing ring can wear out and/or leak.

Further, conventional fluid rotary passages involve the problem of constructing the contact surfaces between the sealing rings and the sealing ring carriers or the fitting bodies in such a manner that reliable sealing is achieved while leakage and simultaneously the drag moment are as small as possible. No satisfying solution of this problem has been found up to present so that conventional fluid rotary passages either achieve low friction at the cost of a considerable leakage or very good sealing at the cost of high friction.

BRIEF SUMMARY OF THE INVENTION

Based on the above-described prior art, it is an object of the present invention to provide a fluid rotary passage (especially an oil rotary passage) with which the above-described problems in conventional fluid rotary passages can be removed, at least partially.

For the solution of the above-mentioned technical problem the invention provides a fluid rotary passage of the type described at the outset, wherein the sealing ring carrier and the fitting body together form two axially spaced receiving grooves for the sealing rings, and wherein the sealing rings are open toward the fluid pressure chamber and each comprises at least one holding protrusion, which secures the sealing ring disposed in the receiving groove against a radial dislocation from the groove toward the fluid pressure chamber, at least in sections.

The fluid rotary passage according to the invention is characterized in that the sealing ring carrier and the fitting body together form two axially spaced receiving grooves for the sealing rings, wherein the receiving grooves are open toward the fluid pressure chamber. The receiving grooves each comprise at least one holding protrusion that secures the sealing ring disposed in the receiving groove against radial dislocation from the groove toward the fluid pressure chamber, at least in areas.

Preferably, the holding protrusion can be arranged radially inside the outer diameter of the associated sealing ring disposed in the receiving groove. Further, the holding protrusion can be arranged radially inwardly of the associated sealing ring disposed in the receiving groove.

Accordingly, the positioning of the sealing rings in a fluid rotary passage is considerably facilitated. During the assembly of the fluid rotary passage, a sealing ring can be arranged in a receiving groove or in a part of the receiving groove, and the holding protrusion guarantees that the sealing ring once arranged in the receiving groove or in a part of the receiving groove is not subject to a radial displacement or, if so, only to a minor radial displacement. Accordingly, the fluid rotary passage of the present invention not only facilitates the arrangement of the sealing ring for the assembly of the fluid rotary passage but also prevents malfunction caused by a dislocation of the sealing ring in the fluid rotary passage. For example, it is possible to prevent leakage because the sealing ring that is arranged in the receiving groove in a targeted manner has outer surfaces that are secured against displacement and that correspond with surfaces on the fitting body or on the sealing ring carrier so that the sealing ring together with the fitting body or the sealing ring carrier reliably forms predetermined contact surfaces for sealing. Further, the fluid rotary passage is prevented from jamming, since the sealing ring is prevented from getting into a position in which it can cause jamming of the fitting body and the sealing ring against each other. Moreover, the response of the fluid rotary passage can be considerably improved because the holding protrusion guarantees that the sealing ring is always arranged at least in a position near its predetermined sealing seat in the fluid rotary passage according to the invention.

The fact that the receiving grooves are open toward the fluid pressure chamber guarantees that the fluid inside the fluid pressure chamber can make contact with the sealing ring in the receiving groove so that a force can be exerted on the sealing ring, particularly when the fluid is pressurized, the force allowing the sealing ring to be pressed against the fitting body and/or the sealing ring carrier so that the fluid pressure chamber is securely sealed.

The holding protrusion can be continuous all round, which particularly well prevents the sealing ring from displacing in the receiving groove. However, it can also be advantageous if the holding protrusion is constructed in the form of several circumferentially spaced protrusions. This can, for example, facilitate the arrangement of the sealing ring in the receiving groove and guarantee an improved connection of the receiving groove and the fluid pressure chamber.

The receiving grooves are constructed in such a manner that at least one sealing ring can be arranged in the receiving grooves, wherein the sealing ring which is arranged in the receiving groove is in contact with a respective contact surface on the sealing ring carrier and on the fitting body. Accordingly, the receiving grooves regularly comprise a section of the sealing ring carrier and a section of the fitting body as well as the holding protrusion. The holding protrusion can also be comprised by the region of the fitting body and/or by the region of the sealing ring carrier. Additionally, it is possible although not necessary for the region of the fitting body and/or the sealing ring carrier which is comprised by the receiving groove to have embossings that are advantageous for constructing the receiving groove. Further, it can be advantageous to provide several holding protrusions, in particular axially offset holding protrusions. Thus the sealing ring can be supported against a displacement in the radial direction on both axial ends thereof. Preferably, the receiving groove can be constructed with a holding protrusion in such a manner that in the operating condition of the fluid rotary passage the sealing ring is in contact with the fitting body and the sealing ring carrier only through the contact surface. At the same time, the sealing ring can substantially be in no contact with the holding protrusion. This can be implemented, for example, by the fluid from the fluid pressure chamber being provided between the holding protrusion and the sealing ring in the operating condition of the fluid rotary passage. The friction during the operation of the fluid rotary passage can thus be minimized.

Preferably, the sealing rings in the respective receiving groove are arranged with play in such a manner that the respective contact surfaces of the sealing ring which can be applied in a sealing manner against the corresponding contact surfaces of the sealing ring carrier and/or the fitting body can be spaced from the respective corresponding contact surface in a direction vertical to the respective contact surface of the sealing ring. This spacing can be small. This spacing enables the sealing ring to change its position with respect to the contact surface, for example, with respect to the corresponding contact surface, if no pressure is exerted on the sealing ring for urging the sealing ring against the respective corresponding contact surface. This can independently apply to the contact surface opposite the sealing ring carrier and/or the fitting body, for example independently at a change of position parallel to the shaft axis of the respective shaft and/or in a radial direction, respectively.

In particular, both receiving grooves need not necessarily be identically constructed. Especially with view to easy assembly, it can be advantageous for the two receiving grooves being constructed differently from each other.

Preferably, the sealing ring carrier and/or the fitting body can be disposed on the shaft or in the shaft seat in a sealing manner. This prevents leaks of the fluid pressure chamber at the interfaces of fitting body and shaft and/or sealing ring carrier and shaft seat or sealing ring carrier and shaft and/or fitting body and shaft seat, at least as far as possible.

In an advantageous embodiment, the sealing ring carrier is integrally formed with the shaft or the shaft seat. The sealing ring carrier can be produced in the shaft or in the shaft seat for example by a milling, turning or other manufacturing process. By using a forming, casting or welding technique it also possible to construct the shaft in such a manner that it comprises the sealing ring carrier. This guarantees a particularly inexpensive manufacture of the sealing ring carrier and/or a particularly easy assembly of the fluid rotary passage and also ensures that the sealing ring carrier is fixed for rotation with the shaft or the shaft seat.

The sealing ring carrier can also comprise a component which is separate from the shaft and the shaft seat. It is also possible for the sealing ring carrier to comprise an additional component that is integrally formed with the shaft or with the shaft seat and also cooperates at least with the component which is formed separately from the shaft and the shaft seat and which functions as a sealing ring carrier. It is also possible for the sealing ring carrier being comprised of several or only one separate component. By the fact that the sealing ring carrier comprises a component which is separate from the shaft and the shaft seat, it is possible for the component to be subsequently fitted for example to a prefabricated shaft or shaft seat, for implementing the sealing ring carrier. This can be particularly advantageous in a case where the sealing ring carrier exclusively consists of separate components because in this case a sealing ring carrier for a fluid rotary passage is fitted to serialized shafts or in serialized shaft seats thus allowing the fluid rotary passage for the shaft and the shaft seat to be implemented inexpensively. Also, the use of separate components for implementing the sealing ring carrier can guarantee or can at least be beneficial for the implementation of a fluid rotary passage for example for a shaft having a certain diameter in combination with shaft seats having different diameters, by the variation of the components. The same applies to the implementation of a fluid rotary passage for a shaft seat of shafts having different diameters.

Preferably, the sealing ring carrier and/or the fitting body can form a press fit on the shaft or in the shaft seat. This guarantees that the sealing ring and/or the fitting body are mounted to the shaft or to the shaft seat in a manner secured against rotation, at least substantially, while the press fit can be particularly easily implemented.

Moreover, the sealing ring carrier can comprise a separate component in the form of a hollow cylinder whose lateral area has an L-shaped longitudinal section, wherein the long side of the "L" defines the length of the hollow cylinder and the short side of the "L" defines the width of a collar of the hollow cylinder. The long side of the "L" is applied against the shaft, at least in sections, whereas the short side of the "L" extends from the shaft toward the shaft seat. In addition to the basic shape of the hollow cylinder, the component can also comprise other geometrical shapes. In particular, a holding protrusion can be provided on the short side of the "L" which is closest to the shaft seat and which points toward the long side of the "L". Preferably, in addition to the L-shaped component, the sealing ring carrier can also comprise a further component arranged on the shaft. For example, the shaft can include a protrusion which points toward the shaft seat and against which the axial end of the long side of the "L" facing away from the short side of the "L" can be applied. The sealing ring carrier can be formed by that protrusion and that L-shaped component. For example, the protrusion can be formed as a further separate component or also integrally with the shaft. For example, the protrusion can be formed as a material step worked into the shaft. For example, this enables the separate L-shaped component to be axially sleeved onto the shaft until it makes contact with the protrusion or is fixed to the shaft in a manner axially spaced from the protrusion. This guarantees a particularly simple and/or inexpensive implementation of a sealing ring carrier. The described preferred embodiment in which the sealing ring comprises an L-shaped, hollow-cylindrical component having an L-shaped cross section, at least in sections, can also be constructed in such a manner that the long side of the "L" is applied against the shaft seat and the short side of the "L" correspondingly extends toward the shaft. The above-described forms of construction can also be applied to the present embodiment.

Further, the sealing ring carrier can be constructed in the form of a hollow cylinder whose lateral area comprises a U-shaped longitudinal section, wherein the base of the "U" is in contact with the shaft, at least in sections. The sealing ring carrier can be seated as a press fit on the shaft, at least in sections, via the base of the "U". The sealing rings are arranged on the inner surface of the legs of the "U". For this purpose, holding protrusions for example can be arranged on the inner surface of the "U".

Further, the fitting body can be constructed in the form of a hollow cylinder whose lateral area comprises a U-shaped longitudinal section, wherein the free ends of the legs of the "U" are in contact with the shaft seat, at least in sections. The fitting body can bear against a sealing ring arranged in the sealing ring carrier, for example by the base of the "U". On the ends of the legs which are located on the base of the "U", for example, a recess or a holding protrusion can be arranged for receiving a sealing ring. Between the fitting body and the sealing ring carrier a fluid pressure chamber is formed, wherein the fitting body can be supported against the shaft seat with the free legs of the "U" in order to counter the pressure from the fluid pressure chamber with a force. Thus the sealing ring can be pressed against the fitting body through a pressure in the fluid pressure chamber.

Preferably, first anti-twist elements can be provided on the fitting body, which correspond with second anti-twist elements that are disposed on at least one of the sealing rings in order to prevent the sealing ring from rotating with respect to the fitting body. Thus the occurrence of friction between the fitting body and the sealing ring can be avoided so that no or only minor heating of the fitting body is caused even at high relative rotation speeds of the shaft and the shaft seat. This can be beneficial particularly for a fitting body made from a synthetic material or from other materials having a low thermal resistance, in order to avoid wear or even destruction of the fitting body.

It can be particularly advantageous if the sealing rings or at least one of the sealing rings do/does not axially protrude from the fitting body when the sealing ring is pressed against the fitting body. In this case, the axial extent of the sealing ring is smaller than the axial distance between one axial end of the fitting body and its receiving groove boundary assigned to that end and defining the receiving groove in which the sealing ring can be arranged. This considerably simplifies the mounting of the fluid rotary passage. In this case, for example, the fitting body and the sealing rings can be inserted into the sealing ring carrier jointly and simultaneously, without the sealing rings between the fitting body and the sealing ring carrier getting jammed or damaged.

In an advantageous embodiment, at least one holding protrusion is disposed on the sealing ring carrier in both receiving grooves so that the respective receiving groove is open toward the fluid pressure chamber between the holding protrusion and the fitting body. The holding protrusion can be integrally formed with the sealing ring carrier, for example by a forming process. But the holding protrusion can also be manufactured separately from the sealing ring carrier and can be connected to the sealing ring carrier thereafter. The arrangement of the holding protrusion on the sealing ring carrier can be particularly beneficial for the assembly of the fluid rotary passage because it allows the sealing ring to be placed onto the holding protrusion on the sealing ring carrier that is arranged for example on the shaft, whereupon components such as the fitting body and the shaft seat, which are arranged on the radial outside, can be mounted. As the receiving groove is open toward the fluid pressure chamber between the holding protrusion and the fitting body, the fluid which is present in the fluid pressure chamber can enter into the receiving groove and can exert for example a corresponding pressure on the sealing ring in a direction toward the fitting body and/or the sealing ring carrier.

In a further advantageous embodiment, at least one or several holding protrusions are integrally formed with the sealing ring carrier and/or the fitting body. The integral construction of the holding protrusions can be particularly beneficial for an inexpensive manufacture of the fluid rotary passage and for the robustness of the fluid rotary passage. Depending on the design of the receiving groove, it can be advantageous to provide holding protrusions on the sealing ring carrier and/or the fitting body, while it is particularly important in the construction of the holding protrusions to consider the capability of arranging the sealing rings in the receiving grooves and the interaction of the sealing rings disposed in the receiving grooves and the fitting body or the sealing ring carrier.

Further, at least one or more holding protrusions can be provided on the fitting body, wherein the receiving groove is open toward the fluid pressure chamber between the holding protrusion and the sealing ring carrier. Thus it is possible, for example, to arrange the sealing rings on the fitting body, for mounting the sealing rings in the fluid rotary passage. Further, particularly in the case of a fitting body which is produced by an injection molding process, the implementation of the holding devices can be particularly simple and inexpensive. Moreover, in certain forms of construction, it can be advantageous for the fluid pressure chamber being open between the holding protrusion and the sealing carrier, thus guaranteeing a particularly good penetration of the fluid into the receiving groove and good sealing of the fluid pressure chamber.

Moreover, the holding protrusion can be constructed as a groove wall of the receiving groove for the sealing ring and can be circular all around. As a groove wall, the holding protrusion accordingly defines the receiving groove, in which the sealing ring is disposed. As a result of the circular and continuous construction of the holding protrusion, the holding protrusion is particularly well adjusted to the circular cross section of the shaft, the shaft seat and the sealing rings so that a dislocation of the sealing ring in or from the receiving groove can be prevented very well.

In a further advantageous embodiment, the holding surface of the at least one or all of the holding protrusions on the respective sealing rings makes an angle between 10° and 80°, preferably between 30° and 60°, with the radial vector and the radial vector is perpendicular to the axis of the shaft. The holding surface of a holding protrusion is the surface that faces the sealing ring, wherein at least sections of the holding surface can be in contact with the sealing ring, particularly for avoiding a dislocation of the sealing ring. The holding surface can also be curved, in which case the angle data stated above are related to the region of the holding surface in which the sealing ring can be in contact with the holding surface in the mounted fluid rotary passage. It can be assured by the provision of the correspondingly angled holding surface that the fluid from the fluid pressure chamber enters between the holding surface and the sealing ring, at least in sections. Moreover, it is possible through the angled holding surface to reduce or completely prevent the friction loss between the holding surface and the sealing ring in a relative rotational movement of the sealing ring and the holding surface. Further, the holding surface that is arranged in angled manner with respect to the radial vector can be particularly beneficial for the support of the sealing ring, particularly during the assembly of the fluid rotary passage.

Further, in the operating condition of the fluid rotary passage, at least one or both sealing rings can be in contact with the fluid in the fluid pressure chamber on the axial side thereof facing away from the contact surface with the sealing ring carrier. A corresponding construction can provide for a high contact force of the sealing ring on the sealing ring carrier, especially when the fluid in the fluid pressure space is pressurized. Normally, a sealing ring together with the sealing ring carrier on one of its axially outer faces forms a contact surface. By the fluid being in contact with the axial side of the sealing ring which faces away from the contact surface, the fluid is capable of exerting a force toward the contact surface between the sealing ring carrier and the sealing ring. As a result, the sealing ring is pressed against the sealing ring carrier as good as possible and thus affords good sealing between the sealing ring carrier and the sealing ring.

The fluid pressure chamber can additionally comprise a fluid-guiding gap that extends between the side of the sealing ring facing away from the sealing ring carrier and the fitting body. The fluid can make contact with the sealing ring through that gap so that the fluid can for example exert a force vertically to the contact surface and/or to the fitting body.

In the fluid rotary passage according to the invention, it can be particularly advantageous if the relative rotational movement takes place mainly between the sealing ring and the sealing ring carrier and only insignificantly between the sealing ring and the fitting body, though it is still required that a force is always exerted on the sealing ring toward the sealing ring carrier because this alone allows the leakage between the sealing ring carrier and the sealing ring to be kept as small as possible while fluid from the fluid pressure chamber can also enter between the sealing ring and the sealing ring carrier, depending on the pressing force of the sealing ring toward the sealing ring carrier, so that lubrication can be carried out between the sealing ring and the sealing ring carrier. Accordingly, the design of the gap can have direct influence on the sealing ring carrier and possibly also on the sealing ring and toward the fitting body.

The gap can be constructed in different ways. For example, a step can be provided on the fitting body which can have the function of a holding protrusion, wherein a gap between the step and the sealing ring is produced through the introduction of a pressurized fluid into the fluid pressure chamber only when the sealing ring is lifted off the step by the fluid and is pressed against the sealing ring carrier and the fitting body. In a corresponding manner, a gap can be formed at the step. It is also possible for the gap being formed as a truncated cone.

This can be implemented, for example, by the fitting body comprising a holding protrusion with a holding surface that is inclined to the radial vector, wherein the sealing ring is lifted off the holding surface by the fluid so that a conically truncated gap is produced between the inclined holding surface and the sealing ring. The sealing ring can comprise a surface that is parallel to the holding surface, at least in sections.

The gap can comprise regions with a different axial width particularly along its radial extent. For example, the axial width of the gap can be larger toward the fluid pressure chamber, for facilitating the entry of the fluid into the gap. Also, the axial width of the gap can be larger for example at positions of the sealing ring opposite the contact surface between the sealing ring and the sealing ring carrier in order to guarantee a better buildup of pressure on the sealing ring and thus better pressing of the sealing ring against the contact surface.

It can be particularly advantageous if at least one or both sealing rings have a surface section that is in contact with the fluid in the fluid pressure chamber and whose surface is at least substantially parallel to the contact surface between the sealing ring carrier and the sealing ring. Thus a force can be exerted on the sealing ring through the fluid which is substantially perpendicular to the contact surface between the sealing ring carrier and the sealing ring so that a particularly good contact pressure of the sealing ring against the sealing ring carrier via the contact surface is guaranteed.

Moreover, at least one or both sealing rings can be in contact with the fluid in the fluid pressure chamber on the radial side thereof facing away from the contact surface with the fitting body. The pressing of the sealing ring against the fitting body can thus be enhanced. By the relative arrangement between the contact surface and the surface on the outer side of the sealing ring which is opposed to the contact surface and which is in contact with the fluid, it is possible to influence the force exerted on the contact surface for pressing the sealing ring against the fitting body or also against the sealing ring carrier. The contact force is the highest in the case in which the outer face of the sealing ring which is in contact with the fluid is parallel to the contact surface, since the force is thus vertically exerted on the contact surface.

Accordingly, it can also be advantageous if one or both sealing rings have a surface section that is in contact with the fluid in the fluid pressure chamber and whose surface is parallel to the contact surface between the fitting body and the sealing ring.

Advantageously, at least one holding protrusion of the respective sealing ring can grip behind the sealing ring on the radially inner side thereof. The holding protrusion can be disposed for example on the sealing ring carrier or on the fitting body, and corresponding holding protrusions can also be arranged on both the sealing carrier and the fitting body. By gripping behind the sealing ring on the radially inner side thereof, it is effectively prevented that the sealing ring moves out of the receiving groove and toward the radial center of the shaft. The holding protrusions can also be implemented by a recess which is provided on the sealing ring carrier and/or the fitting body for receiving the sealing ring.

In a further advantageous embodiment, the contact surface of the sealing rings against the sealing ring carrier is smaller than the contact surface of the sealing rings against the fitting body, respectively. This guarantees that the relative rotational movement between the shaft and the shaft seat takes place more through a relative rotational movement between the sealing ring and the sealing ring carrier and less through a relative rotational movement between the sealing ring and the fitting body.

Also, the contact surface between the sealing ring and the fitting body and/or between the sealing ring and the sealing ring carrier can include recesses. The recesses can be provided both on the fitting body or the sealing ring carrier and correspondingly on the sealing ring as well as on the sealing ring and on the fitting body or the sealing ring carrier. Through the recesses, the contact surface between the sealing ring and the sealing ring carrier or the fitting body can be lubricated so that a rotational movement of the sealing ring with respect to the sealing ring carrier or fitting body is enhanced. Accordingly, due to these recesses, the effective contact surface is kept small. However, as the recesses only have a small depth starting from the contact surface, the fluid from the fluid pressure chamber penetrates between the sealing ring and the sealing ring carrier or the fitting body only to a limited extent so that leakage is further prevented, at least as far as possible, despite lubrication. The recesses can have different shapes. For example, the recesses can be semicircular or semioval. The widest area of the recess can point toward the fluid pressure chamber, thus allowing the fluid from the fluid pressure chamber to penetrate between the sealing ring and the fitting body or the sealing ring carrier, wherein the taper of the recesses in a direction away from the fluid pressure chamber can result in the prevention of leakage as far as possible. The recesses can have the form of lubricating pockets. Particularly, the recesses can be equally distributed over the circle of the contact surface defined by the sealing ring.

In an advantageous embodiment, the ratio between the lateral face per radial section on the side of the sealing ring facing the sealing ring carrier and the contact surface per radial section between the sealing ring and the sealing ring carrier decreases with an increasing radius of the sealing ring, at least in sections. A lubrication from the fluid pressure chamber can thus take place between the sealing ring carrier and the sealing ring, wherein the lubrication decreases with an increasing radius until, from a certain radius, the lateral face per radial section on the side of the sealing ring facing the sealing ring carrier corresponds with the contact surface per radial section between the sealing ring and the sealing ring carrier so that from that radius, the sealing ring makes contact with the sealing ring carrier through its contact surface and no fluid can enter between the sealing ring and the sealing ring carrier. Thus the sealing of the fluid pressure chamber through the sealing ring and sealing ring carrier is ensured.

In addition, the distance between the sealing ring carrier and the side of at least one or both sealing rings which faces the sealing ring carrier can increase in the radial direction from the contact surface toward the shaft axis. Thus a fluid from the fluid pressure chamber can enter between the sealing ring carrier and the sealing ring from the direction of the shaft axis, wherein the entry of the fluid between the sealing ring and the sealing ring carrier becomes increasingly difficult with an increasing distance from the shaft axis, since the distance between the sealing ring carrier and the sealing ring reduces in a corresponding manner. Thus a corresponding sealing between the sealing ring and the sealing ring carrier can be guaranteed simultaneously with a low friction during relative rotational movements between the sealing ring and the sealing ring carrier.

Further, both sealing rings can be cut through in the axial direction. This facilitates the mounting of the fluid rotary passage and reduces the manufacturing cost of the sealing rings.

In a further advantageous embodiment, the contact surface between the sealing ring and the fitting body makes an angle between 60° and 120°, in particular between 75° and 105°, with the contact surface between the sealing ring and the sealing ring carrier. Sealing can thus be obtained for instance through a contact pressure on the sealing ring which is produced by a pressurized fluid from the fluid pressure chamber and is exerted in the direction toward the fitting body and in the direction toward the sealing ring carrier, without requiring any additional measures, because by a corresponding arrangement of the contact surfaces between the sealing ring and the fitting body and also between the sealing ring and the sealing ring carrier, the sealing ring can, through the exertion of a correspondingly directed force from the fluid pressure chamber, be pressed between the sealing ring carrier and the fitting body in such a manner that a sealing is obtained against the sealing ring carrier and also against the fitting body and that the sealing ring only is in contact with the contact surfaces on the sealing ring carrier and the fitting body.

The contact surface between the sealing ring and the fitting body and/or the contact surface between the sealing ring and the sealing ring carrier can have the form of a section of a lateral surface of a cylinder or a truncated cone. The selection of the form of the contact surface can be made dependent in particular on the design of the sealing ring and on the possible desired frictional contact or the possible desired relative rotational movement between the sealing ring and the sealing ring carrier or the fitting body.

The invention also relates to a machine comprising a fluid rotary passage as described above. Such a machine can be implemented for example inexpensively and reliably. Such a machine can comprise a hydraulic or particularly also a pneumatic system including fluid passages which comprises at least one fluid rotary passage according to the invention.

Such a machine can be constructed, for example, as a transmission or as a different system comprising a fluid rotary passage according to the invention. The machine can be part of a vehicle, in particular of an automotive vehicle.

The fluid passage can be used, for example, at an operating pressure of 1.25 to 20 bar, preferably at an operating pressure of 1.5 to 15 bar or 1.5 to 10 bar, particularly 2 to 10 bar, without being limited thereto. This can respectively apply for hydraulic or pneumatic systems.

In the Figures exemplary embodiments are shown in which the fluid rotary passages of the invention are constructed as oil rotary passages. In the described oil rotary passages the fluid pressure chamber is formed as an oil pressure chamber in which oil is provided as the fluid. The examples which are described are applicable also to other fluid passages comprised within the scope of the invention in which other fluids are used, such as gases or pressurized gases, e.g. air/pressurized air.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
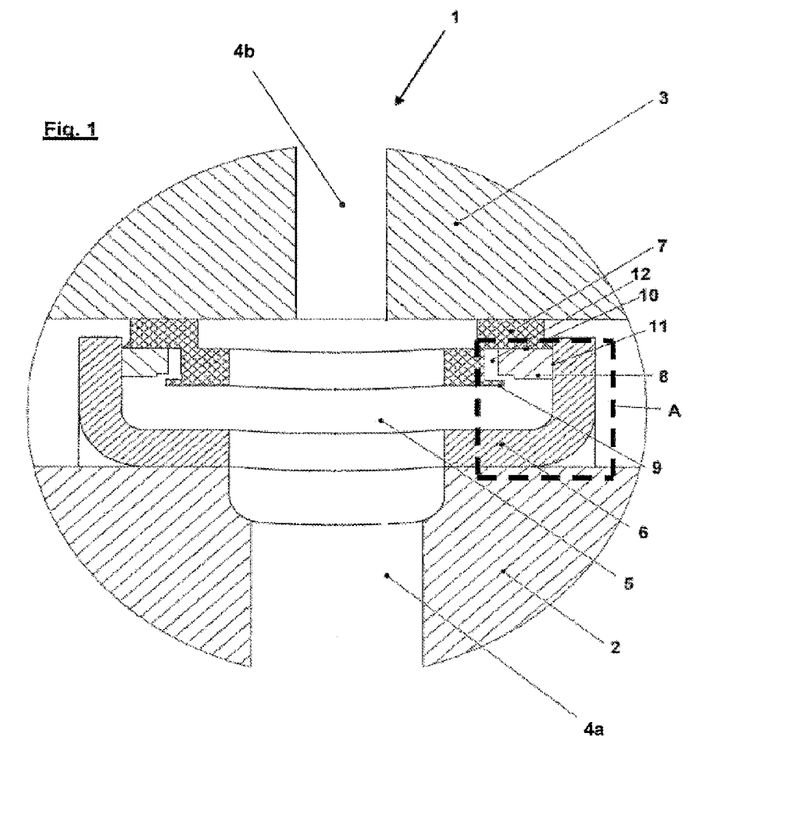
FIG. 1 is a sectional view of the rotary oil passage according to an embodiment of the invention, in the mounted state.

FIG. 1 shows a detail from the sectional view of an oil rotary passage 1 according to an embodiment of the invention. In this detail, the radial and axial sections of an oil rotary passage 1 according to the invention are shown, wherein an oil pressure chamber 5 is arranged between the radially inner shaft 2 and the radially outer shaft seat 3. A U-shaped sealing ring carrier 6 is press-fitted to the shaft 2. The sealing ring carrier 6 is fixed for rotation with the shaft 2. The shaft 2 and also the shaft seat 3 are each formed as a hollow shaft.

The shaft 2 and the shaft seat 3 each comprise an oil passage channel. The oil passage channel of the shaft 2 comprises an oil-guiding channel 4a through which the oil passage channel of the shaft 2 is connected to the oil pressure chamber 5. The oil passage channel of the shaft seat 3 comprises an oil-guiding channel 4b through which the oil passage channel of the shaft seat 3 is connected to the oil pressure chamber.

The oil-guiding channel 4a leads from the section of the oil passage channel radially inside the shaft 2 to the oil pressure chamber 5 that is arranged between the shaft seat 3 and the shaft 2. Through the oil-guiding channel 4a in the shaft 2, oil from the oil passage channel in the shaft 2 can enter into the oil pressure chamber and can be pressurized therein. Further, through the oil-guiding channel 4b in the shaft seat 3, oil from the oil passage channel in the shaft seat 3 can enter into the oil pressure chamber 5 and can be pressurized therein. In the illustrated example, the diameter of the oil-guiding channel 4a in the shaft 2 is larger than the diameter of the oil-guiding channel 4b in the shaft seat. However, in other embodiments of the invention, the diameters can also be equally large or the diameter of the oil-guiding channel 4b in the shaft seat 3 can be larger than that of the oil-guiding channel 4a in the shaft 2. In further exemplary embodiments (not illustrated) of the oil rotary passage according to the invention, it is also possible that only one oil-guiding channel 4a is provided in the shaft 2 or only one oil-guiding channel 4b is provided in the shaft seat.

The oil pressure chamber 5 is arranged between the sealing ring carrier 6 disposed on the shaft 2 and the fitting body 7 disposed on the shaft seat 3. The fitting body 7 is U-shaped, wherein both free legs of the "U" are supported against the shaft seat 3 so that the pressure in the oil pressure chamber 5 is countered by a corresponding force. The fitting body 7 and the sealing ring carrier 6 are sealed against each other through two sealing rings 8 that are axially spaced form each other.

As the sealing ring carrier 6 is fixed for rotation with the shaft and as the fitting body 7 in the assembled oil rotary passage 1 can only be moved relative to the shaft seat 3 with high effort, the relative rotational movement between the shaft seat 3 and the shaft 2 takes place substantially through the relative rotational movement of the sealing ring 8 with respect to the fitting body 7 and with respect to the sealing ring carrier 6. In a corresponding manner, the contact surfaces 10, 11 between the sealing ring 8 and the fitting body 7 or the sealing ring carrier 6 are constructed in such a manner that a good sealing is implemented on the one hand and that the fitting body 7 or the sealing ring carrier 6 can be twisted with respect to the sealing ring 8 on the other hand.

In the embodiment illustrated in FIG. 1, a holding protrusion 9 is provided on the fitting body 7 which secures the sealing ring 8 against radial dislocation from the receiving groove toward the oil pressure chamber 5. The receiving groove is formed by the fitting body 7 and the sealing ring carrier 6. Further, the holding protrusion 9 is constructed as a groove wall of the receiving groove. Accordingly, the sealing ring 8 is in the receiving groove, wherein the receiving groove is open toward the oil pressure chamber 5 so that a fluid can enter into the receiving groove and can make contact with the sealing ring 8. In the embodiment which is shown in FIG. 1, the fluid from the oil pressure chamber 5 is applied against sides of the sealing ring 8 which respectively oppose the contact surface 10 between the sealing ring 8 and the fitting body 7 or the contact surface 11 between the sealing ring carrier 6 and the sealing ring 8. Between the fitting body 7 and the sealing ring 8, a gap 12 is provided into which fluid from the oil pressure space 5 can enter. In a corresponding manner, a pressure can be exerted on the sealing ring 8 by the pressurized fluid in the fluid pressure chamber 5 so that the sealing ring is pressed against the contact surface 11 and toward sealing ring carrier 6 and against the contact surface 10 and toward the fitting body 7 so that sealing against the fitting body 7 and against the sealing ring carrier 6 is effected through sealing ring 8.

In the illustrated exemplary embodiment, although not shown in FIG. 1, the holding protrusion is formed continuously and circularly all round. Accordingly, during the assembly of the oil rotary passage 1 according FIG. 1 of the invention, the sealing ring 8 can be arranged on the fitting body 7, wherein the holding protrusion 9 serves the positioning of the sealing ring 8 on the fitting body 7. Of course, the holding protrusion 9 can also be in the form of several circumferentially spaced protrusions.

FIGS. 2 to 7 each show a detail of a cross section of an embodiment according to the invention. In the illustration of the diameter of the oil rotary passage of FIG. 1, the detail which is respectively shown is drawn in over sector A.

Figure 2:
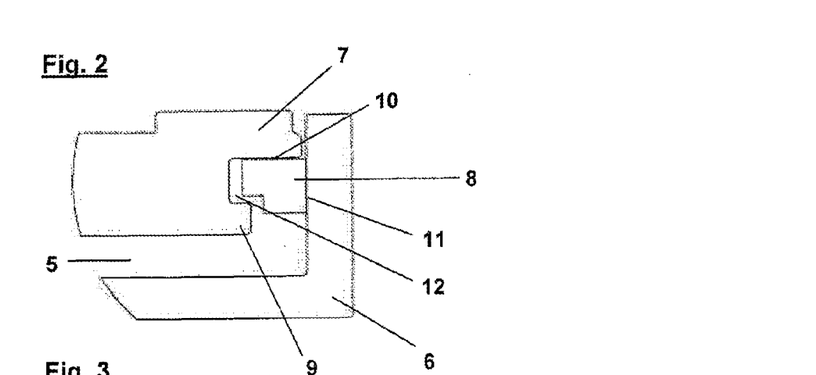
FIGS. 2-7 are details of various embodiments of sector A of the embodiment of FIG. 1.

In the embodiment according to FIG. 2, the fitting body 7 has a recess in which the sealing ring 8 can be arranged, and also a holding protrusion 9, which prevents a dislocation of the sealing ring 8 in the radial direction from the receiving groove toward the oil pressure chamber 5. The fitting body 7 thus includes a step in the cross section. The sealing ring 8 which is arranged in the receiving groove between the fitting body 7 and the sealing ring carrier 6 comprises a step corresponding to the step of the fitting body 7. Thus the sealing ring 8 can be well supported by the holding protrusion 9 for mounting the oil rotary passage 1 on the one hand and on the other hand a gap is thus produced between the fitting body 7 and the sealing ring 8 during the operation of the oil rotary passage. In particular, the gap is produced due to the pressurized fluid in the oil pressure chamber 5 being in contact with the sealing ring 8 and thus exerting a force on the sealing ring 8 in the direction toward the sealing ring carrier 6 and in the direction toward the fitting body 7. In the illustrated embodiment, the sides of the sealing ring carrier 8 opposite the contact surfaces 10 and 11 which are in contact with the fluid from the fluid pressure chamber 5 are arranged parallel to the contact surfaces 10 or 11. In a corresponding manner, a high force which acts vertically on the contact surfaces 10 or 11 can be exerted on the sealing ring 8 through the pressurized fluid from the oil pressure chamber.

Figure 3:
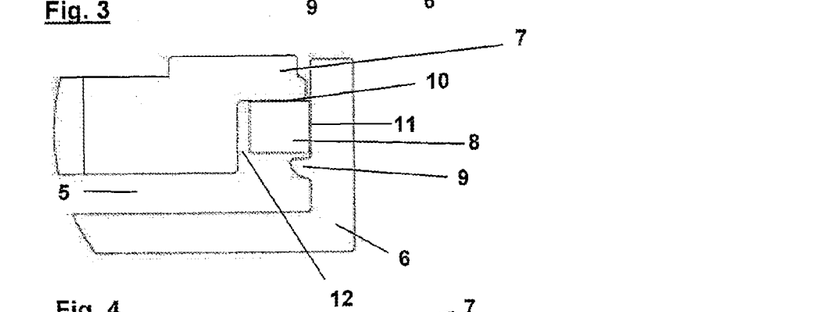

FIG. 3 shows an embodiment of an oil rotary passage 1 according to the invention in which the holding protrusion 9 is formed on the sealing ring carrier 6. The sealing ring 8 has a square cross section. Therefore, during the assembly of the oil rotary passage 1 according to the embodiment illustrated in FIG. 3, the sealing ring 8 can be arranged on the holding protrusion 9 on sealing ring carrier 6 before the fitting body 7 is installed radially outside. After the assembly of the oil rotary passage 1, the sealing ring 8 is arranged in the receiving groove, which is formed by the sealing ring carrier 6 and the fitting body 7. As explained in context with FIG. 2, in the assembled state of the oil rotary passage 1, the sealing ring 8 is pressed against the fitting body 7 or the sealing ring carrier 8 on the contact surfaces 10 or 11 through the pressurized fluid in the fluid pressure chamber 5. At this time, a gap 12 is produced between the fitting body 7 and the sealing ring 8 and a distance is produced between the holding protrusion 9 and the sealing ring 8.

Figure 4:
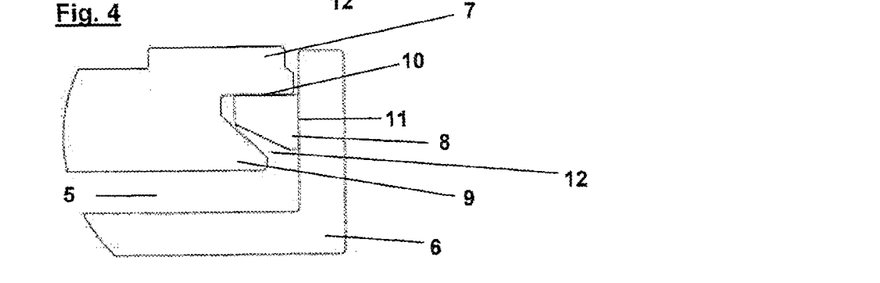

In the embodiment shown in FIG. 4, the holding protrusion 9 is arranged on the fitting body 7, and both the holding surface of the holding protrusion 9 facing the sealing ring 8 and the side of the sealing ring 8 facing the fitting body 7 are inclined to the radial vector, wherein the holding surface is tilted to the above-mentioned side of the sealing ring 8. In a corresponding manner, the axial width of the gap 12 between the fitting body 7 and the sealing ring 8 decreases with an increasing radial distance. Thus, in the embodiment shown in FIG. 4, the pressing of the sealing ring 8 against the fitting body 7 and against the sealing ring carrier 6 is enhanced at the time of the fluid entering into the oil pressure chamber and being pressurized, since the inclined surfaces of the holding protrusion 9 and of the sealing ring 8 cause the sealing ring 8 to be displaced in a direction toward the sealing ring carrier 6 and the fitting body 7. Moreover, the contact surface 11 and the contact surface 10 are each parallel to the outer surfaces of the sealing ring 8 which are in contact with the fluid from the fluid pressure space 5, only in sections. The contact pressure on the sealing ring 8 which is produced by the fluid in the direction toward the contact surface 10 or the contact surface 11 can be varied via the angle of the surfaces that are in contact with the fluid and via the size of the respective surfaces that are parallel or inclined to the contact surface 10 or parallel or inclined to the contact surface 11. In a corresponding manner, the contact pressure of the sealing ring 8 acting on the fitting body 7 or on the sealing ring carrier 6 can be influenced via the design of the sealing ring 8. In addition, the entry of the fluid into the gap 12 can be influenced via the design of the holding protrusion 9 and by changing the axial width of the gap 12 which also has an effect on the pressing of the sealing ring 8 against the fitting body 7 or the sealing ring carrier 6.

Figure 5:
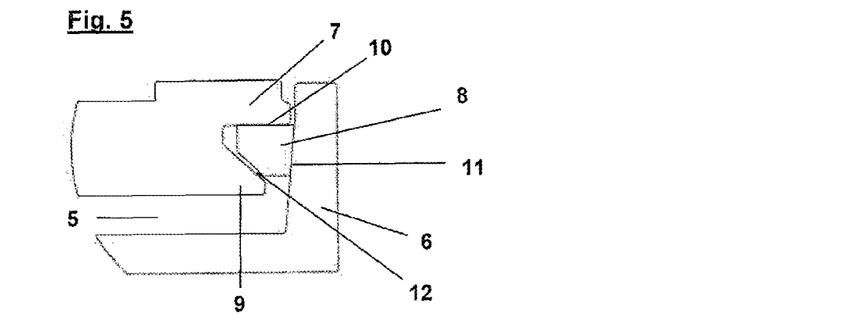

The embodiment shown in FIG. 5 is similar to the embodiment shown in FIG. 4, wherein the gap 12 has the same axial width throughout its radial extent and wherein the contact surface 11 is tilted to the radial vector, whereas the contact surface 11 in FIG. 4 is parallel to the radial vector. Corresponding to the description of FIG. 4, the contact pressure of the sealing ring 8 against the sealing ring carrier 6 on the contact surface 11 can be varied by tilting the contact surface 11 to the radial vector in co-action with the outer faces of the sealing ring 8 facing away from the sealing ring carrier 6. Here it must be taken into account that the pressurized fluid always exerts a force vertically on the surface of the sealing ring 8 which is in contact with the fluid so that the angle between the surface through which the fluid exerts a force on the sealing ring 8 and the contact surface 11 influences the contact force at the contact surface 11 and thus the sealing of the oil pressure chamber 5 between the sealing ring 8 and the sealing ring carrier 6.

Figure 6:
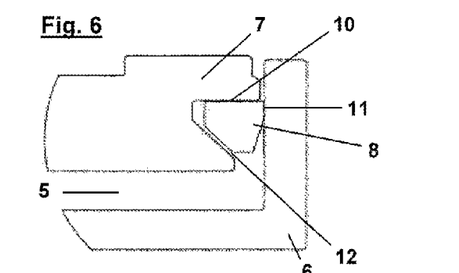
Figures 8, 9:
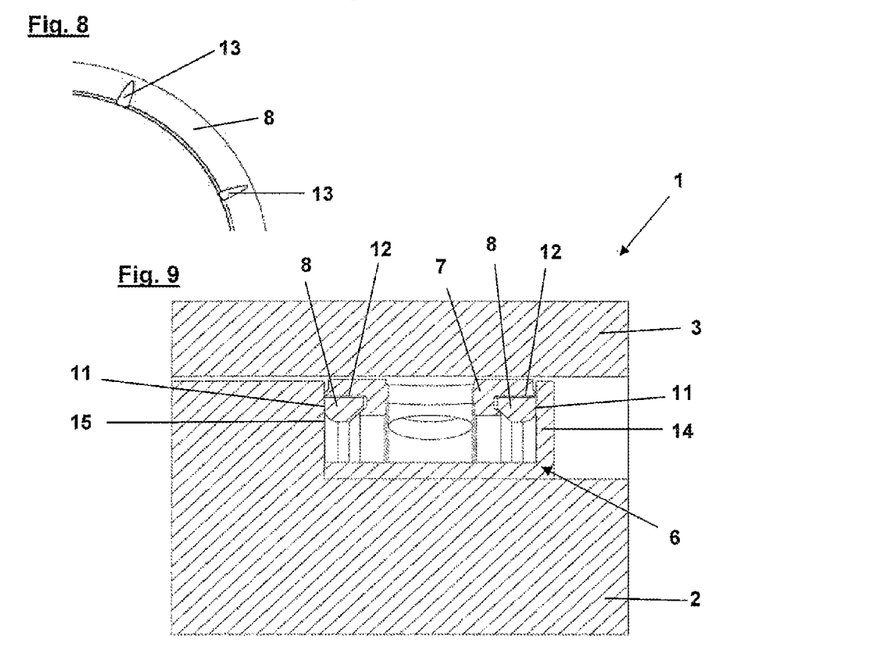
FIG. 8 is a schematic diagram of a detail of the side of the sealing ring facing the sealing ring carrier of an embodiment according to the invention.
FIG. 9 is a schematic diagram of a detail from a sectional view of a further embodiment according to the invention.

In the embodiment illustrated in FIG. 6, the sealing ring 8 is not applied against the sealing ring carrier 6 on its entire side facing the sealing ring carrier 6. The sealing ring 8 is rather spaced from the sealing ring carrier 6 on its radial side that faces the radial center of the shaft so that a fluid from the oil pressure chamber 5 can enter between the sealing ring 8 and the sealing ring carrier 6, at least in sections. Thus lubrication is possible between the sealing ring 8 and the sealing ring carrier 6, whereby the friction between the sealing ring 8 and the sealing ring carrier 6 is reduced. A corresponding lubrication can also be implemented by recesses 13 being provided on the sealing ring 8, as illustrated in FIG. 8. However, attention has to be paid to that fluid from the oil pressure chamber 5 is able to enter between the sealing ring 8 and the sealing ring carrier 6, while the entry of the fluid into the intermediate space between the sealing ring 8 and the sealing ring carrier 6 is constantly limited by the contact surface 11 between the sealing ring 8 and the sealing ring carrier 6. In the illustrated embodiment, the contact surface 11 has a radial extent between 0.05 and 0.1 mm.

Figure 7:
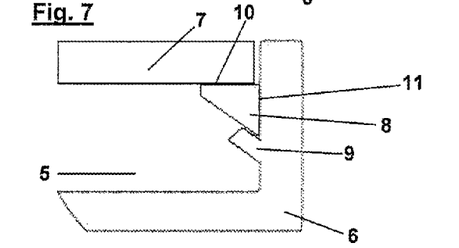

In the embodiment shown in FIG. 7, the holding protrusion 9 is formed on the sealing ring carrier 6, wherein the holding surface of the holding protrusion 9 forms an angle of approx 45° to the radial vector. The sealing ring 8 has a side that faces the holding protrusion 9 and whose surface is parallel to the holding surface of the protrusion 9. In a corresponding arrangement, the sealing ring 8 can be particularly easily fixed to the holding protrusion 9 during the assembly of the oil rotary passage 1. In addition, the inclined progress of the side of the sealing ring 8 facing the radial center of the shaft allows the sealing ring 8 to be reliably pressed against the fitting body 7 and the sealing ring carrier 6 upon entry of the oil into the oil pressure chamber 5. As explained above, the contact force between the sealing ring 8 and the fitting body 7 as well as between the sealing ring 8 and the sealing ring 6 can be adjusted through the angle the side of the sealing ring 8 which faces the radial center of the shaft makes with the radial vector. In a corresponding manner and depending on the desired operation of the oil rotary passage 1, an increased contact pressure can be provided either at the contact surface 10 or at the contact surface 11 so that the relative rotational movement either takes place mainly between the sealing ring 8 and the fitting body 7 or mainly between the sealing ring 8 and the sealing ring carrier 6. Of course, it is also possible for the relative rotational movement to take place in equal shares between the sealing ring carrier 6 and the sealing ring 8 as well as between the fitting body 7 and the sealing ring 8.

According to the embodiments shown in FIGS. 1 to 7, the sealing rings are disposed in the respective receiving groove with play in such a manner that the respective contact surfaces that can be sealingly applied against the corresponding contact surfaces of the sealing ring carrier and/or fitting body can be spaced (at least slightly) from the respectively corresponding contact surface in a direction vertical to the respective contact surface of the sealing ring. This enables the sealing ring when it is not pressed against the respectively corresponding contact surface, to change its position with respect to the contact surface, for example, the corresponding contact surface. This can independently apply for the contact surface against the sealing ring carrier and/or against the fitting body, for example, independently for a change of position parallel to the shaft axis of the respective shaft and/or in a radial direction.

FIG. 8 shows the side of the sealing ring 8 facing the sealing ring carrier 6 according to one embodiment of an oil rotary passage 1 of the invention. The illustrated side of the sealing ring 8 includes recesses 13 that function as lubricating pockets. Corresponding to the acutely tapering recesses 13, the ratio between the lateral surface per radial section on the side of the sealing ring 8 facing the sealing ring carrier 6 and the contact surface 11 per radial section between the sealing ring 8 and the sealing ring carrier 6 decreases with an increasing radius of the sealing ring 8 along the extent of the recess 13. The recesses can, however, also be lenticular or rectangular.

The construction of the oil rotary passage 1 according to the invention enables a particularly easy assembly of the oil rotary passage 1. In addition, the contact pressure on the contact surfaces 10 and 11 can be respectively adjusted by the design of the sealing ring 8, the fitting body 7, the sealing ring carrier 6 and the holding protrusion 9, and the lubrication between the sealing ring 8 and the fitting body 7 or the sealing ring carrier 6 can be predetermined. By a corresponding adaption of the design of the above-mentioned components it is easy to adjust the desired balance between an ideal sealing and a lowest possible friction in a relative rotational movement of the shaft 2 and the shaft seat 3.

It will be understood that the features described in the respective embodiments can be combined with each other at will. For example, the described lubrication between the sealing ring 8 and the sealing carrier 6 through the entry of the fluid between the sealing ring 8 and the sealing ring carrier 6 can be analogously used also for lubrication between the fitting body 7 and the sealing ring 8. Corresponding further analogies for the combination of the features described are known to a person skilled in the art.

FIG. 9 is a schematic diagram of a detail from a sectional view of an embodiment according to the invention in which the sealing ring carrier 6 comprises a separate component 14 in the form of a hollow cylinder whose lateral area comprises a longitudinal section in the form of an "L". The hollow cylinder has a collar whose width is defined by the length of the short side of the "L".

The component 14 is applied with the inside of its lateral area against the shaft 2 in a press-fit. The sealing ring carrier 6 is formed by this separate component 14 and the step 15 provided on the shaft 2. The step 15 is embossed in the shaft 2. In the present embodiment, the step 15 has been formed in the shaft 2 by a turning process.

Both sealing rings 8 of the oil rotary passage 1 are respectively applied with a contact surface 10 against the fitting body 7 in the installed position of the oil rotary passage 1. Moreover, one of the two sealing rings 8 is applied with a further contact surface 11 against this separate component 14 of the sealing ring carrier 6 while the other one of the two sealing rings 8 is applied with a further contact surface 11 against this step 15 of the sealing ring carrier 6. In the present embodiment, the sealing ring 6 can be implemented by slipping the separate component 14 onto the shaft until the long side of the "L" of the separate component 14 makes contact with the step 15. In the described embodiment, the oil rotary passage 1 can be formed by first arranging the fitting body 7 and the sealing rings 8 on the separate component 14 and then slipping them over the shaft 2 together with the component 14. The oil rotary passage 1 can also be formed by first slipping the separate component 14 over the shaft 2 and connecting it to the shaft and then arranging the sealing rings 8 and the fitting body 7 on the sealing ring carrier 6. In further embodiments (not illustrated) it is also possible for the separate component 14 not being in contact with the step 15. Also, instead of the step 15, a protrusion in the shaft 2 or an additional separate component can be provided.

Figure 10:
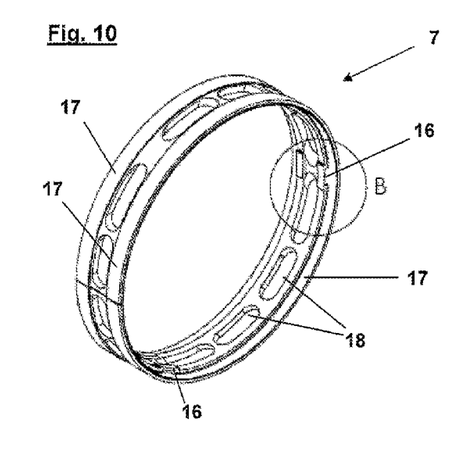
FIG. 10 is a schematic diagram of a fitting body of an embodiment according to the invention.

FIG. 10 is a schematic diagram of a fitting body 7 of an embodiment according to the invention, wherein first anti-twist elements 16 are disposed on the fitting body 7. The fitting body 7 is in the form of a ring, which is axially cut through at one position thereof. The fitting body 7 comprises circumferentially distributed recesses 18 which, for example, can function as a fluid passage. In the present exemplary embodiment, the recesses 18 are arranged centrally on the fitting body 7. The fitting body 7 additionally comprises rim portions 17 on which sealing rings 8 can be arranged. The rim portions 17 are defined toward the axial center of the fitting body 7 by a step delimiting the receiving groove. In the present exemplary embodiment of an oil rotary passage according to the invention, during the assembly of the oil rotary passage 1, a sealing ring 8 can be arranged on the rim portion 17 of the fitting body 7 in such a manner that its lateral surface which points toward the axial center of the fitting body 7 is in contact with the receiving groove delimiting step defining the rim portion 17, substantially over the full circumference thereof. This will be explained in more detail below.

Figure 11:
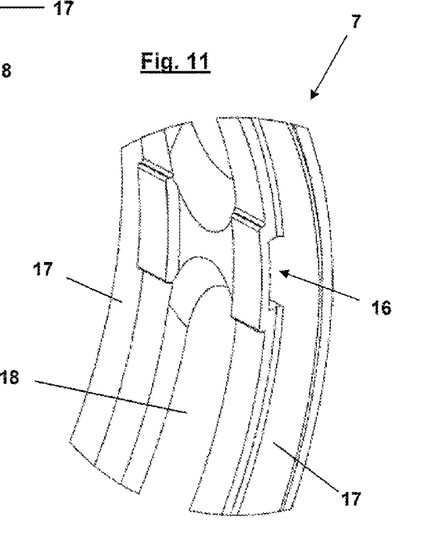
FIG. 11 is a schematic diagram of a detail from FIG. 10.

FIG. 11 is a schematic diagram of the detail B of the fitting body plotted in FIG. 10. As apparent from FIG. 11, the receiving groove delimiting step which defines the rim portion 17 of the fitting body 7 includes a groove into which a sealing ring 8 can be inserted. The first anti-twist elements 16 of the fitting body 7 comprise a kind of bridge over a recess in the receiving groove delimiting step that defines the rim portion 17.

Figure 12:
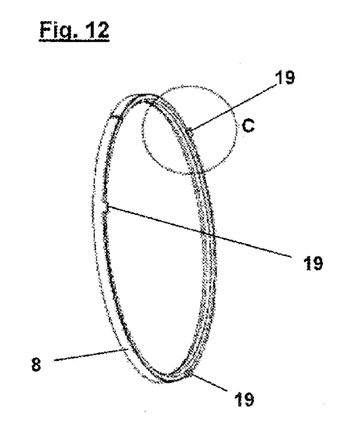
FIG. 12 a schematic diagram of a sealing ring of the embodiment according to FIG. 10.

FIG. 12 shows the sealing ring 8 of the embodiment of the invention according to the FIGS. 10 and 11. On one of its axial ends the sealing ring 8 includes two circumferentially distributed anti-twist elements 19 and is axially cut through at one position thereof. In the described embodiment of the oil rotary passage 1 according to the invention, the sealing ring 8 is arranged on the fitting body 7 in such a manner that the second anti-twist elements 19 of the sealing ring 8 correspond with the first anti-twist elements 16 of the fitting body 7 in such a manner that the second anti-twist elements 19 protrude into the recesses formed by the first anti-twist elements 16. This effectively prevents a relative rotation of the sealing ring 8 with respect to the fitting body 7.

In the present embodiment, the sealing ring 8 can be in contact with the boundary step of the fitting body 7 forming the rim portion 17 over its full circumference on its axial side facing the axial center of the fitting body 7, with the exception of those regions in which the first anti-twist elements 16 are arranged. The axial extent of the sealing ring 8 is smaller than the axial extent of the rim portion 17. When the sealing ring 8 is axially pressed against the fitting body 7, the sealing ring 8 does not axially protrude over the fitting body 7. This is advantageous particularly for the assembly of the oil rotary passage 1 according to the invention because the sealing ring 8 and the fitting body 7 can be arranged on the sealing ring carrier 6 without clamping. In the described embodiment, the fitting body 7 axially protrudes over the sealing ring 8 by approx 0.1 to 0.3 mm when the sealing ring 8 is axially pressed against the fitting body 7.

Figure 13:
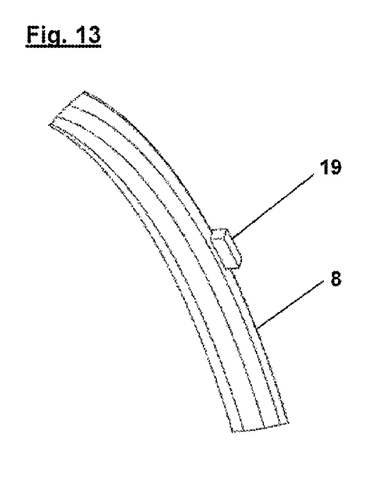
FIG. 13 is a detail of the sealing ring shown in FIG. 12.

From FIG. 13, in which the detail C of the sealing ring 8 in FIG. 12 is shown, the form of the second anti-twist elements 19 is apparent. The second anti-twist elements 19 are in the form of a block, wherein the width and the height of the block are slightly smaller than the width and the height of the recesses of the first anti-twist elements 16. However, in further embodiments also other designs of first and second anti-twist elements 16, 19 are possible. For example, the second anti-twist elements can be triangular or trapezoidal and can engage in correspondingly formed first anti-twist elements. Also, the first and the second anti-twist elements 16, 19 together can constitute snap-lock connections.

Figure 14:
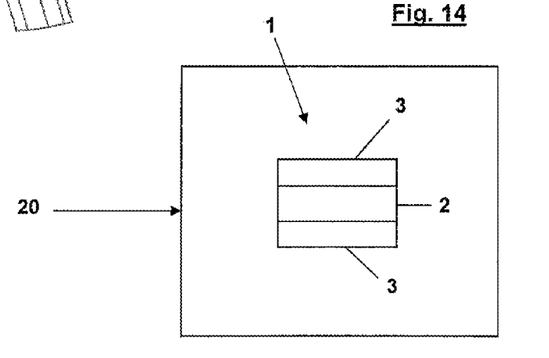
FIG. 14 is a schematic view of a transmission according to an embodiment of the invention.

FIG. 14 schematically shows a transmission 20. The transmission 20 according to the invention comprises an oil rotary passage 1 according to the invention. In the transmission 20, first elements are connected to the shaft 2 and second elements are connected to the shaft seat 3. Accordingly, in the transmission 20 a rotation of first elements with respect to second elements can take place through the oil rotary passage 1 according to the invention.

Within the scope of the invention, the respective embodiments can be used in a corresponding manner also in pneumatic systems. The fluid can be a pressurized gas such as air.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A fluid rotary passage for sealing a fluid pressure chamber between a rotatable shaft and a shaft seat, the fluid rotary passage comprising:
   a sealing ring carrier rotationally fixed to one of the shaft and the shaft seat in a fluid-tight manner,
   a fitting body in contact with the other of the shaft and the shaft seat in a fluid-tight manner, the fitting body and the sealing ring carrier being radially spaced from each other, at least in sections, in order to create a fluid pressure chamber therebetween,
   two axially spaced apart sealing rings, each sealing ring having one contact surface sealingly applied against a respective contact surface of the sealing ring carrier and having another contact surface sealingly applied against a respective contact surface of the fitting body, for sealing the fluid pressure chamber against the outside, each sealing ring being twistable with respect to at least one of the sealing ring carrier and the fitting body,
   wherein the sealing ring carrier and the fitting body together form two axially spaced apart receiving grooves for the sealing rings, each receiving groove comprising a section of the sealing ring carrier and a section of the fitting body, and each receiving groove being open toward the fluid pressure chamber and having at least one holding protrusion at least partially securing the sealing ring disposed in the respective receiving groove against radial dislocation from the receiving groove toward the fluid pressure chamber.

2. The fluid rotary passage according to claim 1, wherein the sealing ring carrier comprises a component which is separate from the shaft and the shaft seat.

3. The fluid rotary passage according to claim 2, wherein the sealing ring carrier and/or the fitting body is arranged on the shaft or on the shaft seat in a press-fit.

4. The fluid rotary passage according to claim 2, wherein the sealing ring carrier comprises a component having a form of a hollow cylinder whose lateral area comprises a longitudinal section in a form of an "L", wherein the long side of the "L" defines a length of the hollow cylinder and the short side of the "L" defines a width of a collar of the hollow cylinder, and wherein the long side of the "L" is at least partially in contact with the shaft, and the short side of the "L" extends from the shaft toward the shaft seat.

5. The fluid rotary passage according to claim 2, wherein the sealing ring carrier has a form of a hollow cylinder whose lateral area comprises a U-shaped longitudinal section, wherein the base of the "U" is at least partially in contact with the shaft.

6. The fluid rotary passage according to claim 1, wherein the fitting body has a form of a hollow cylinder whose lateral area comprises a U-shaped longitudinal section, wherein free ends of the legs of the "U" are at least partially in contact with the shaft seat.

7. The fluid rotary passage according to claim 1, wherein first anti-twist elements are arranged on the fitting body which correspond with second anti-twist elements arranged on at least one of the sealing rings, for preventing rotation of the sealing ring with respect to the fitting body.

8. The fluid rotary passage according to claim 1, wherein in both receiving grooves at least one holding protrusion is provided on the sealing ring carrier so that the respective receiving groove is open toward the fluid pressure chamber between the holding protrusion and the fitting body.

9. The fluid rotary passage according to claim 1, wherein at least one holding protrusion is integrally formed with the sealing ring carrier and/or the fitting body.

10. The fluid rotary passage according to claim 1, wherein at least one holding protrusion is arranged on the fitting body, wherein the receiving groove is open toward the fluid pressure chamber between the holding protrusion and the sealing ring carrier.

11. The fluid rotary passage according to claim 1, wherein the holding protrusion is formed as a groove wall of the receiving groove for the sealing ring and is designed circularly and continuously all round.

12. The fluid rotary passage according to claim 1, wherein a holding surface of the at least one holding protrusion makes an angle between 10° and 80° with a radial vector on the respective sealing ring.

13. The fluid rotary passage according to claim 1, wherein the fluid pressure chamber comprises a fluid-guiding gap that extends between a side of the sealing ring facing away from the sealing ring carrier and the fitting body.

14. The fluid rotary passage according to claim 13, wherein along its radial extent the gap comprises regions having a mutually different axial width.

15. The fluid rotary passage according to claim 1, wherein at least one of the sealing rings has a surface section in contact with a fluid in the fluid pressure chamber and whose surface is at least substantially parallel to the contact surface between the sealing ring carrier and the sealing ring.

16. The fluid rotary passage according to claim 1, wherein at least one of the sealing rings is in contact with a fluid in the fluid pressure chamber on its radial side facing away from the contact surface with the fitting body.

17. The fluid rotary passage according to claim 1, wherein at least one of the sealing rings comprises a surface section in contact with a fluid in the fluid pressure chamber and whose surface is parallel to the contact surface between the fitting body and the sealing ring.

18. The fluid rotary passage according to claim 1, wherein at least one holding protrusion of the respective sealing ring grips behind that sealing ring on a radially inner side thereof.

19. The fluid rotary passage according to claim 1, wherein the respective contact surface of the sealing rings against the sealing ring carrier is smaller than the respective contact surface of the sealing rings against the fitting body.

20. The fluid rotary passage according to claim 1, wherein the contact surface between the sealing ring and the fitting body and/or between the sealing ring and the sealing ring carrier includes recesses.

21. The fluid rotary passage according to claim 1, wherein a ratio between a lateral surface per radial section on a side of the sealing ring facing the sealing ring carrier and the contact surface per radial section between the sealing ring and the sealing ring carrier decreases with an increasing radius of the sealing ring, at least in sections.

22. The fluid rotary passage according to claim 1, wherein a distance between the sealing ring carrier and a side of at least one sealing ring facing the sealing ring carrier increases in a radial direction from the contact surface toward a shaft axis.

23. The fluid rotary passage according to claim 1, wherein both sealing rings are cut through in an axial direction.

24. The fluid rotary passage according to claim 1, wherein the contact surface between the sealing ring and the fitting body makes an angle between 60° and 120° with the contact surface between the sealing ring and the sealing ring carrier.

25. The fluid rotary passage according to claim 1, wherein the contact surface between the sealing ring and the fitting body and/or the contact surface between the sealing ring and the sealing ring carrier has a form of a section of a lateral area of a cylinder or of a truncated cone.

26. A machine comprising a fluid rotary passage according to claim 1.

* * * * *